Inventor
John E. Morren
Dawson, Tilton, Fallon
Lungmus & Alexander
Attorneys

United States Patent Office 3,428,660
Patented Feb. 18, 1969

3,428,660
PROCESS FOR RECOVERING FATTY ACIDS AND TRIGLYCERIDE OIL FROM SOAPSTOCK
John E. Morren, Bloomingdale, Ill., assignor, by mesne assignments, to Baker Perkins Inc., Saginaw, Mich., a corporation of New York
Filed Jan. 20, 1964, Ser. No. 338,812
U.S. Cl. 260—412.5                 4 Claims
Int. Cl. C11b 13/02

ABSTRACT OF THE DISCLOSURE

A process for recovering fatty acids and triglyceride oil from soapstock containing the oil and soap as principal components comprising continuously mixing the soapstock at a temperature above 175° F. but not over 300° F., preferably between about 200 and 270° F., with an aqueous mineral acid such as sulfuric acid to obtain an acidulated mixture with the soap converted to free fatty acids and salt. The mixture comprises an aqueous phase containing the salt and excess mineral acid and an oil phase containing the triglyceride oil and free fatty acids. The mixture is continuously passed into a centrifugal force field in the outer portion of the field but at a position spaced inwardly from the outermost boundary thereof whereby the oil phase flows inwardly and wash water is continuously introduced into the field at a position inwardly of the mixture but spaced outwardly from the innermost boundary thereof so that the wash water flows outwardly in continuous countercurrent contact with the oil phase which is flowing inwardly. The oil phase is removed at the inward position of the force field and the aqueous phase, containing the wash water, is removed from an outward position of the force field.

---

This invention relates to a process for recovering fatty acids and triglyceride oil from soapstock. More particularly, this invention is concerned with a continuous process for acidulating an aqueous alkaline soapstock to convert the soap to fatty acids, and then separate the fatty acids and triglyceride oil from the aqueous phase. In one of its preferred embodiments, this invention also involves the continuous water washing of the fatty acids and triglyceride oil as they are separated from the aqueous phase, thereby obtaining fatty acids and oil substantially free from the acid employed for the acidulation.

Soapstock is a by-product of soda ash and alkali refining processes for triglyceride oils. Triglyceride oils which are refined for use in the manufacture of salad oils, shortening, and margarine oils, include vegetable oils, such as soybean, cottonseed, coconut, corn, safflower, sesame, rape, and animal fats, such as lard and tallow. These oils and fats are then subjected to alkali refining by treatment with aqueous sodium hydroxide, or by a combination of soda ash refining and alkali refining. One of the principal purposes of the refining is to remove free fatty acids, such acids being converted to their corresponding alkali soaps and being removed with the aqueous phase. The aqueous phase will also contain some entrained triglyceride oil. The triglyceride oil represents a loss of valuable product, and the fatty acids of the soap also have considerable economic value, if they can be separated and recovered from the soapstock. The soapstock itself has relatively little value, having little use except as an additive to animal feeds.

Heretofore the acidulation of soapstock to recover the triglyceride oil and fatty acids has been carried out in batch operations utilizing large open tanks or kettles. Because of the highly exothermic reaction resulting from the addition of the concentrated acid, the practice has become established of adding the acid to cold soapstock, although this involves losing considerable process heat. The soapstock as produced by the refining process is at an elevated temperature, and it would be desirable to conserve this heat. However, safety requires that the soapstock be cooled to a temperature of at least 100–120° F. before addition of the acid. Addition of acid to hot soapstock involves violent local boiling, foaming, and spewing from the kettle.

Another problem associated with the prior art batch process for acidulation of soapstock is that the reaction mixture of soapstock and acid forms a tenacious emulsion which is difficult to break. Normally sulfuric acid is used, and the cold soapstock and concentrated sulfuric acid are simultaneously pumped into the tank or kettle where the exothermic reaction occurs. during the course of which the emulsion of the fatty material and dilute sulfuric acid is formed. The breaking of this emulsion requires boiling for at least 4–6 hours with the continuous injection of live steam. Following the breaking of the emulsion, separation of the acid water and fatty material in the tank usually requires at least 12–24 hours of settling.

It is therefore a general object of the present invention to provide a process for the acidulation of soapstock to recover the fatty acids and triglyceride oil which substantially overcomes the problems and difficulties described above. A more specific object is to provide a process which permits the process heat of the soapstock as produced in the refining operation to be conserved and utilized. A further object is to provide a process of the character described which substantially avoids the problem of emulsion formation, and which greatly accelerates the time required for the overall process from acidulation through the separation and recovery of the triglyceride oil and fatty acids. A further related object is to provide a process which produces the fatty acids and triglyceride oil in a more highly purified form, and specifically in a more acid-free condition, than has heretofore been possible. Further objects and advantages will be indicated in the following detailed specification.

An embodiment of the process of the present invention is illustrated in the accompanying drawings, wherein.

Figure 1:
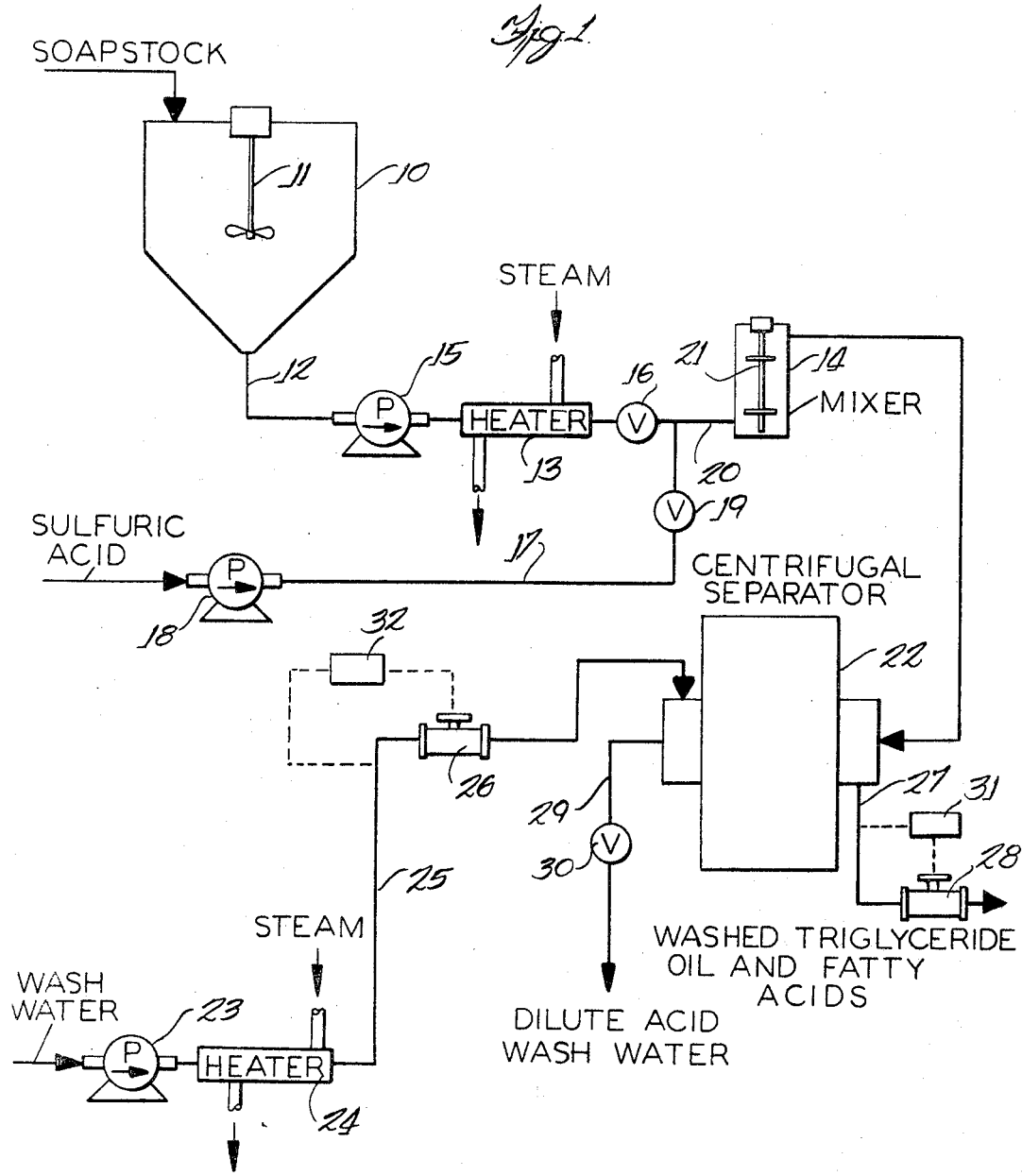
FIGURE 1 is a process flow sheet illustrating an application of the process of this invention.

In practicing the process of the present invention, it is important that the soapstock and aqueous mineral acid be mixed at an elevated temperature. This procedure avoids the cooling of the soapstock as produced in the refining process, and normally additional heating of the soapstock will be required to achieve the desired soapstock temperature for mixing with the mineral acid. The temperature of the soapstock should be raised to above 175° F., while a temperature of at least 200° F. is preferred. Excessive temperatures should be avoided, such as temperatures over 300° F. Preferably, the soapstock is mixed with the acid at a temperature within the range from 200–270° F.

Where the soapstock is heated to a temperature of at least 175° F. and preferably to a temperature of 200° F. or greater, it is not necessary to preheat the aqueous mineral acid. The mixing results in an exothermic reaction which will compensate for the lower temperature of the aqueous mineral acid, and, in, fact, would usually result in a higher temperature of the acidulated mixture than that of the soapstock feed. Consequently, if the soapstock is introduced to the mixer at the required temperature, no further heating of the mixture is required, although such further heating would be possible if needed. The acidulated mixture preferably has a temperature in excess of 200° F. up to 270° F. While somewhat higher mixture temperatures may be used to 300° F., these are usually undesirable. Consequently, it will usually be good practice to preheat the soapstock to a temperature on the lower side of the range of 200–270° F., such as a temperature of 225–245° F., and the resulting temperature of the acidulated mixture will then normally not exceed 270° F.

The high temperature mixing of the present invention preferably is carried out in a closed mixer as part of a continuous process. By continuously mixing the soapstock feed with the aqueous mineral acid at the specified elevated temperatures, the formation of a stable emulsion is avoided, that is, any emulsion which forms, breaks readily. It is then feasible to subject the acidulated mixture while at the elevated temperature to centrifugal separation. In the acidulation, the soap is converted to free fatty acids with the formation of a salt of the mineral acid, and the free alkali in the soapstock is neutralized, which results in the formation of further salt. The acidulation mixture then consists of an aqueous phase which contains the salt and any excess mineral acid, and an oil phase which contains the triglyceride oil in admixture with the free fatty acids. According to the method of this invention, the acidulated mixture is continuously subjected to centrifugal separation while at a temperature of at least 175° F. and preferably not less than 200° F., up to the maximum temperatures previously specified for the acidulated mixture. In this operation, the oil and fatty acids are separated from the aqueous phase and removed as the light phase from the centrifugal separator while the aqueous phase is removed as the heavy phase.

When soapstock is produced in the alkali refining of vegetable oils and animal fats it is an aqueous alkaline mixture containing triglyceride oil and soap as principal components. For example, the soapstock may comprise: 1–20% triglyceride oil, 10–60% soap, 20–90% water and .5–2% free alkali. Many soapstocks contain about 10–20% triglyceride oil, 40–60% soap, 20–45% water and .5–2% free alkali. Usually, the soaps are present as sodium soaps and the free alkali is sodium hydroxide.

For the purpose of the present invention, it will usually be desirable to dilute the soapstock as produced by adding additional water, thereby making the soapstock more easily pumpable, and permitting it to be more easily processed on a continuous basis. Preferably, the diluted soapstock will contain from 65–85% water by volume. Correspondingly, a diluted soapstock will contain the recoverable components, the soap and triglyceride oil, in an amount of about 15–35% by volume on a total fatty acid basis (TFA).

The mineral acid is preferably sulphuric acid, although other strong acids could be used, such as nitric acid, hydrochloric acid, and phosphoric acid. This is preferably added in the form of a concentrated aqueous solution. However, this is merely a matter of convenience, and the concentration of the acid is not critical, providing that sufficient acid is added to fully acidulate the soapstock. The minimum stoichiometric quantity of the acid is that which is sufficient to neutralize all of the free alkali and to convert all of the alkali soap to free fatty acids. To assure completion of desired reaction, however, it is preferred to employ a slight excess of the acid. The fully acidulated mixture will therefore have an acid pH, usually a pH of 2 or below. The aqueous phase of the acidulated mixture may contain an acid concentration of from .1–5% by weight, although it will usually contain a concentration of about .5–3%.

The sequence of steps of the present invention are further illustrated by the accompanying drawings. Looking first at the flow sheet of FIGURE 1, a storage vessel 10 is shown at the upper left-hand corner into which the soapstock is introduced prior to processing. Vessel 10 may be equipped with an agitator 11. Preferably, as indicated, the soapstock is introduced into vessel 10 after dilution with water. Alternatively, water can be introduced into the holding tank to form the diluted soapstock, and more than one of the holding tanks can be provided so that they can alternately be cut in and out of the feed line 12 through which the soapstock is passed through heater 13 and mixer 14 by means of a pump 15. In the illustration given, heater 13 consists of an indirect heat exchanger wherein the soapstock mixture is heated by steam. Alternately, the soapstock mixture may be heated by direct addition of open steam. A control valve 16 is provided in the line between the heater and the mixer. Either directly into mixer 14 or downstream from the valve 16 but prior to mixer 14 is provided a connection to a line 17 through which the concentrated aqueous sulfuric acid is supplied by means of pump 18, the connection with the line 17 being controlled by a valve 19.

In the illustration given, the streams of heated soapstock and aqueous sulfuric acid are shown being introduced to the mixer 14 through a common line 20. It will be understood, however, that these streams may be separately introduced, since the primary mixing and reaction occurs within the mixer 14. The mixer as shown is provided with a paddle-equipped shaft 21, which is adapted to provide a rapid and thorough mixing of the acid and soapstock. Any other type of mixer may be used as long as a high degree of mixing is obtained. The acid and soapstock streams will be proportioned to achieve the desired slight excess of acid, and will be controlled so that the resulting mixture is relatively uniform and homogeneous. It is therefore possible to pass the acidulated soapstock mixture continuously from the mixer 14 to the centrifugal separator 22 with a minimum of holdup time in the mixer.

As the next step in the process, the acidulated soapstock is subjected to centrifugal separation. This is accomplished by passing the mixture into a radially-extending space being rotated about an axis to provide a centrifugal force field. The mixture is introduced into the outer portion of the space but at a position spaced inwardly from the outermost boundary thereof. In the centrifugal separator, the aqueous phase separates from the oil and fatty acid phase, and flows outwardly toward the outer boundary of the rotating space. It is then removed as the heavy phase from the outer portion of the separator at a position outwardly from the point of introduction of the acidulated soapstock. The oil and fatty acid phase flows inwardly toward the innermost boundary of the space, and is removed from the inner portion of the rotor as the light phase. Preferably, the acidulated mixture is pumped under pressure into the rotating space, and the space is maintained at a superatmospheric pressure. This permits the acidulated soapstock to be processed at a temperature above the boiling point of the aqueous phase (approximately 212° F.). Consequently, centrifugal separator 22 is preferably of the enclosed type, which operates at internal pressures substantially above atmospheric pressure.

In the preferred embodiment of the present invention, as illustrated in the drawings, means is provided for introducing wash water into the centrifugal separator at a position radially inward of the mixture introduction position but spaced outwardly from the innermost boundary of the rotating space. The wash water flows outwardly as the oil and fatty acid phase flows inwardly so that the wash water is brought into countercurrent contact with the oil and fatty acid phase, thereby tending to remove any residual mineral acid from the oil and fatty acid phase. Preferably, suitable contacting elements are provided within the countercurrent flow area of the centrifugal separator to promote the intimate contacting of the wash water with the oil and fatty acid phase. After contacting the oil and removing residual mineral acid therefrom, the wash water will merge with the aqueous phase at it separates from the acidulated soapstock mixture, and the combined, enlarged aqueous phase will then move outwardly in the rotor, and be separated as the heavy phase, as previously explained.

To prevent any undue reduction in the temperature of the acidulated soapstock mixture as it is being separated, it is preferred to preheat the wash water before it is introduced into the rotor. However, the wash water need not be heated to as high a temperature as the acidulated soapstock, and some reduction of temperature is permissible during the separation of the oil and aqueous phases. Usually, a wash water temperature of about 150–200° F. will be satisfactory.

In the flow sheet of FIGURE 1, the wash water is shown being passed by a pump 23 through a heater 24 to a shaft feed inlet of the separator 22. Heater 24 in the illustration given is an indirect heat exchanger utilizing steam as the heating medium although direct steam heating could be used. Line 25 which supplies the wash water to the separator is controlled by an automatic valve 26.

In the flow sheet of FIGURE 1, the washed triglyceride oil and fatty acids are shown being removed from the centrifugal separator 22 through a line 27 which is controlled by an automatic valve 28. The dilute acid wash water is shown being discharged from the separator 22 through a line 29 equipped with a manual control valve 30.

The desired superatmospheric pressure within separator 22 is maintained primarily by valve 28 being set to act as a throttling valve, thereby maintaining a back pressure which controls the pressure within the rotor. In order to maintain the selected back pressure, an automatic control unit 31 can be provided, which automatically opens and closes valve 28 to maintain the predetermined back pressure in line 27. If desired, a similar automatic valve and back pressure control unit can be provided for line 29 instead of or in addition to the manual valve 30. In the illustration given, the wash water inlet line 25 is also provided with an automatic valve 26 which is operated by a flow control unit 32, thereby controlling the rate at which the wash water is pumped into the centrifugal separator. While the enclosed, pressure-type separator is preferred, the process of this invention in its broader aspects can be practiced by using a centrifugal separator of the open type, and the water washing step can be eliminated, or performed subsequent to the separation of the oil and aqueous phases of the acidulated soapstock. However, if an open type centrifugal separator is employed, the temperature must be kept below the boiling point of the aqueous phase.

Figure 2:
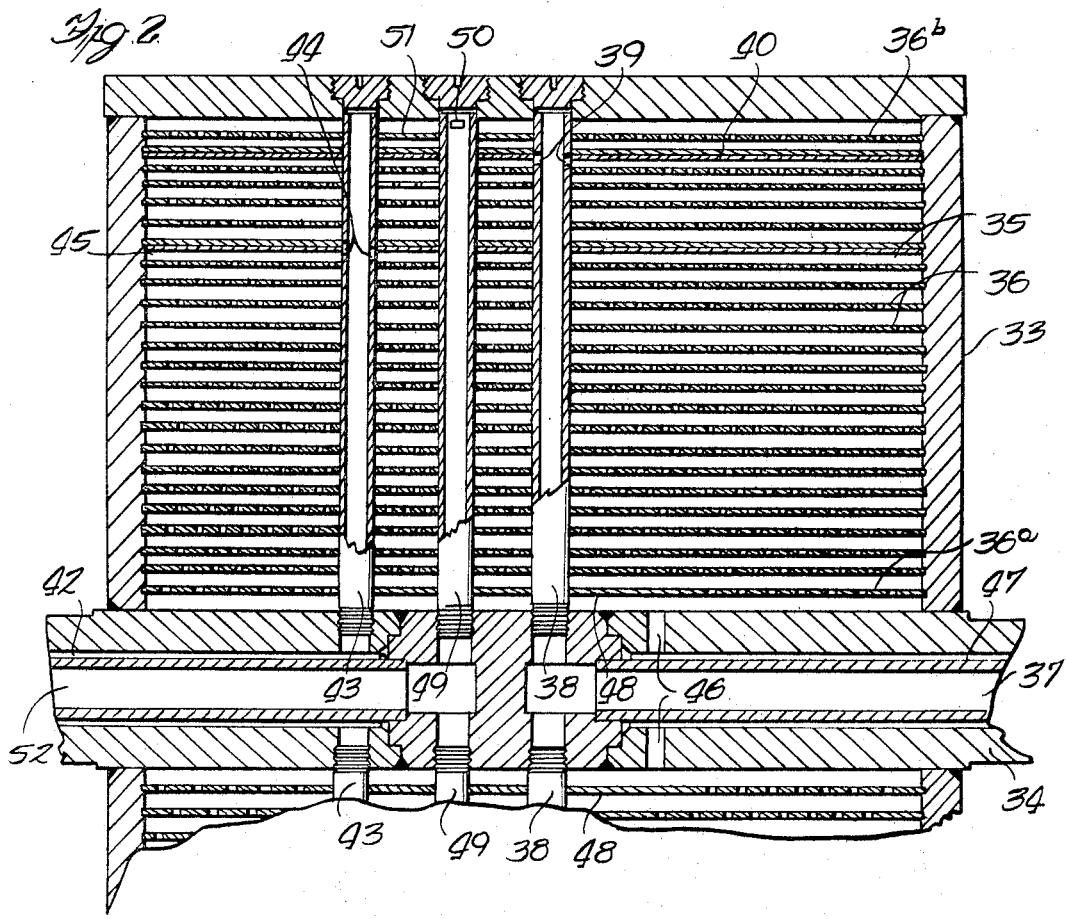
FIGURE 2 is an enlarged fragmentary sectional view of the centrifugal separator, which in the embodiment shown, also includes water washing means.
Figure 3:
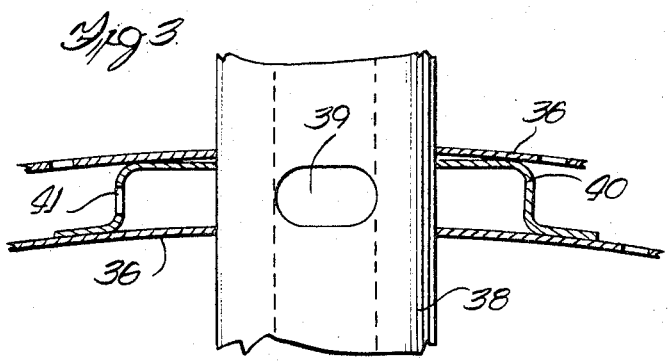
FIGURE 3 is an enlarged fragmentary sectional view of one of the feed inlet distribution manifolds of the centrifugal separator.

A centrifugal separator suitable for use in the process of FIGURE 1 is shown in greater detail in FIGURES 2 and 3. Looking first at FIGURE 2, it can be seen that the separator includes a rotor casing 33 which is mounted coaxially on a shaft 34 and provides a radially-extending chamber 35 therein. The shaft extends horizontally and is rotatably mounted on suitable bearings. The general construction of such centrifugal devices is well known in the art, being described for example in Patents 2,758,783, 2,758,784 and 2,670,132.

In the rotor space 35 there is provided a plurality of radially-spaced perforated cylindrical elements 36, which depending on their relative position within the rotor space, function as contacting elements, or as phase clarifying elements. Here again, the construction and operation of such elements is well known in the art, and is described in greater detail in Patent 3,050,238. While the perforated cylindrical elements are preferred within the countercurrent contacting section of the rotor, other elements may be employed within the clarifying sections, as described more particularly in Patent 3,053,440.

In the illustration given, the acidulated soapstock is supplied through shaft passage 37, which communicates with radially-extending inlet tubes 38. The outer end portions of the tubes are provided with discharge ports 39, which communicate with a horizontally-extending distribution manifold 40, as shown more clearly in FIGURE 3. One of the side walls of the manifold is provided with spaced ports 41 for the discharge of the acidulated soapstock across the full width of the rotor chamber. Preferably, the ports 41 are on the side of the manifold toward the direction of rotation of the rotor.

The wash water is introduced through a shaft passage 42 which communicates with radially-extending inlet tubes 43. The outer portions of the tubes 43 are provided with discharge ports 44, which communicate with the interior of a distribution manifold 45. It will be understood that manifold 45 is constructed in a manner similar to manifold 40, and that it therefore performs the function of distributing the incoming wash water across the full width of the rotor.

As will be noted, the wash water is introduced at a position inwardly of the position of introduction of the acidulated soapstock. In the illustration given, there are five of the perforated rings 36 located between the soapstock and wash water introduction positions. Preferably, a plurality of the contacting rings are employed within the area, which comprises the countercurrent contacting area of the rotor. The rings 36 located outwardly of the position of introduction of the soapstock function primarily as clarifying rings, this area of the rotor comprising the heavy phase clarifying zone. Similarly, the rings 36 located inwardly of the position of introduction of the wash water function primarily as clarifying rings within the light phase clarifying zone of the rotor. The construction shown will assure intimate contacting of the wash water with the oil and fatty acid phase, and thereby will permit the recovery of the oil and fatty acids substantially free of the mineral acid employed for the acidulation.

The clarified, acid-free oil phase, containing the triglyceride oil and fatty acids, is removed through lateral shaft passages 36, which communicate with an annular shaft passage 47. Preferably, a special ring 36a is provided immediately adjacent the entrances to passages 46, which ring has imperforate sections 48 in line with the passage inlets, thereby tending to prevent channeling of the oil phase toward the outlet passages 46.

The dilute acid wash water is removed through radially-extending return tubes 39, which at their outer ends are provided with inlet ports 50, these ports communicating with the outermost portion of the rotor space. Preferably, another specially constructed ring 36b is provided adjacent the inlets 50, and is equipped with imperforate sections 51, which tend to prevent channeling of the aqueous heavy phase toward the ports 50. It will be understood that other types of inlets and outlets may be utilized, and that those described in connection with FIGURES 2 and 3 are merely intended to be illustrative.

As is well known in the art, means are provided for driving the rotor at a controlled rotational speed, for example, the shaft 34 can be driven by fluid drive and motor, permitting change of r.p.m. as desired, and accelerationed operating speed without excessive torque. For a 36-inch diameter rotor, operating speeds of around 1,800–2,200 r.p.m. will usually be satisfactory. It will be understood that shaft 34 will also be equipped at each end with hydraulically balanced mechanical seals for feeding and withdrawing the liquids continuously through the shaft passages previously described. With the construction shown in FIGURE 2, four such seals will be provided, one in connection with each of the shaft passages 37, 42, 47 and 52.

This invention is further illustrated by the following specific examples:

EXAMPLE 1

A soapstock feed obtained as a by-product in the sodium hydroxide refining of cottonseed oil was utilized as produced at a temperature of about 160–170° F. Soapstock was diluted with water until it contained about 75% water by volume. The cottonseed oil and sodium cottonseed soap in the diluted feed stock aggregated 20% by weight total fatty acids (TFA). The diluted soapstock was then passed continuously through a heater where its temperature was raised to 210° F., and fed to a mixer together with concentrated aqueous sulfuric acid. The diluted soapstock was fed at the rate of 15,000 lbs. per hour, and the concentrated acid (90% concentration) was fed at the rate of 585 lbs. per hour. On a stoichiometric basis, this gave an excess of acid, which resulted in about a 2% concentration of the sulfuric acid in the aqueous phase after completion of the reaction. The fully acidulated soapstock as discharged from the mixer at a temperature of about 235° F., was passed continuously through a centrifugal separator equipped with water washing means. The centrifugal separator was similar to the one illustrated in FIGURES 2 and 3.

The acidulated soapstock was passed to the separator-water washer at a pressure of 85 p.s.i. The back pressure on the light phase outlet, which comprised the washed triglyceride oil and fatty acids, was maintained at about 94 p.s.i. Back pressure was also maintained on the dilute acid wash water outlet stream, which comprised the heavy phase, the back pressure being maintained at approximately 57 p.s.i. The wash water was introduced at the rate of 4,350 lbs. per hour and was preheated to a temperature of 150° F.

The product, comprising the washed triglyceride oil and fatty acids, contained 91.4% TFA, 2% water, 0.6% insoluble impurities, and was free of sulfuric acid. The wash water stream as removed from the separator contained only .028% TFA.

EXAMPLE 2

A soapstock feed obtained at about 160° F. as a by-product in the sodium hydroxide refining of soybean oil was diluted with water such that the TFA was 11% by weight. The diluted soapstock was then passed continuously through a heater as in Example 1, and fed to a mixer together with concentrated aqueous sulfuric acid. The diluted soapstock was fed at the rate of 14,890 lbs. per hour and the concentrated acid (90% concentration) was fed at the rate of 445 lbs. per hour. The fully acidulated soapstock was discharged from the mixer at 225° F. and was passed continuously through the centrifugal contactor equipped with means for countercurrent water washing. The wash water was fed at the rate of 3750 lbs. per hour at 165° F.

The product, comprising the washed triglyceride oil and fatty acids, contained 94.2% TFA and 1.8% combined moisture and insoluble impurities. The wash water stream as removed from the centrifugal contactor contained only 0.029% TFA and 1.5% $H_2SO_4$.

The high temperature acidulation process of this invention can also be applied to other feedstocks containing triglyceride oil, or fatty acids, or fatty acid salts. For example, a feedstock obtained by the sodium hydroxide soponification of hydrogenated castor oil (containing 12-hydroxy stearate) can be acidulated as described herein, preferably at a temperature of 200–270° F., and subjected to continuous centrifugation with or without water washing to obtain the fatty acid components (principally 12-hydroxy stearic acid) as the light phase and the acid water as the heavy phase.

While in the foregoing specification this invention has been described in relation to certain specific embodiments thereof, and many details have been set forth for purpose of illustration, it will be apparent to those skilled in the art that the process of this invention is susceptible to other embodiments and that certain of the details set forth herein can be varied without departing from the basic principles of the invention.

I claim:
1. A process for recovering fatty acids and triglyceride oil from soapstock containing triglyceride oil and soap as principal components, comprising continuously mixing said soapstock at a temperature above 175° F. but not over 300° F. with an aqueous mineral acid to obtain an acidulated mixture with said soap being converted to free fatty acids and salts, said acidulated mixture comprising an aqueous phase containing the salt and any excess mineral acid and an oil phase containing the triglyceride oil and free fatty acids, rotating a radially-extending space about an axis to provide a centrifugal force field, continuously passing the acidulated mixture into said rotating radially-extending space at a superatmospheric pressure, said mixture being introduced into the outer portion of said space but at a position spaced inwardly from the outermost boundary thereof, said oil phase flowing inwardly into said space, continuously introducing wash water into said space at a position radially inward of said mixture introduction position but spaced outwardly from the innermost boundary of said space, said wash water flowing outwardly as said oil phase flows inwardly in countercurrent contact therewith, removing the oil phase as the light phase from said space at a position inwardly of the position of introduction of said wash water, and removing the aqueous phase as the heavy phase from said space at a position outwardly of the position of introduction of said acidulated mixture.

2. The process of claim 1 in which said soapstock has a temperature ranging from 200–270° F. when it is mixed with said aqueous mineral acid.

3. The process of claim 2 in which said mineral acid is sulfuric acid.

4. The process of claim 1 wherein said soapstock is at a temperature of from 200–270° F. when mixed with said aqueous mineral acid, and wherein said mineral acid is sulfuric acid.

References Cited

UNITED STATES PATENTS

| | | | |
|---|---|---|---|
| 2,802,845 | 8/1957 | Sadler | 260—412.5 |
| 2,812,343 | 11/1957 | Cox et al. | 260—412.5 |
| 3,050,238 | 8/1962 | Doyle et al. | 260—412.5 |

ALEX MAZEL, *Primary Examiner.*

A. M. TIGHE, *Assistant Examiner.*

U.S. Cl. X.R.

260—424